United States Patent [19]
Krall et al.

[11] 3,806,947
[45] Apr. 23, 1974

[54] MICROWAVE TIMING CIRCUIT FOR BEAM STEERING

[75] Inventors: Albert D. Krall, Rockville; Wallace E. Anderson, Beltsville; Albert M. Syeles, Silver Spring, all of Md.

[73] Assignee: The United States of America as represented by the Secretary of the Navy, Washington, D.C.

[22] Filed: Feb. 5, 1973

[21] Appl. No.: 329,785

[52] U.S. Cl. .................. 343/854, 325/105
[51] Int. Cl. ............................ H01q 3/26
[58] Field of Search ........ 343/DIG. 2, 854; 325/105

[56] References Cited
UNITED STATES PATENTS
3,150,320  9/1964  Gruenberg .................. 343/DIG. 2

*Primary Examiner*—Eli Lieberman
*Attorney, Agent, or Firm*—R. S. Sciascia; J. A. Cooke; Sol Sheinbein

[57] ABSTRACT

A circuit for providing accurate timing pulses to steer an antenna array. A Gunn device coupled at the input of each transmitting element supplies a single pulse at predetermined time intervals to the element enabling time delay steering of the antenna array.

4 Claims, 6 Drawing Figures

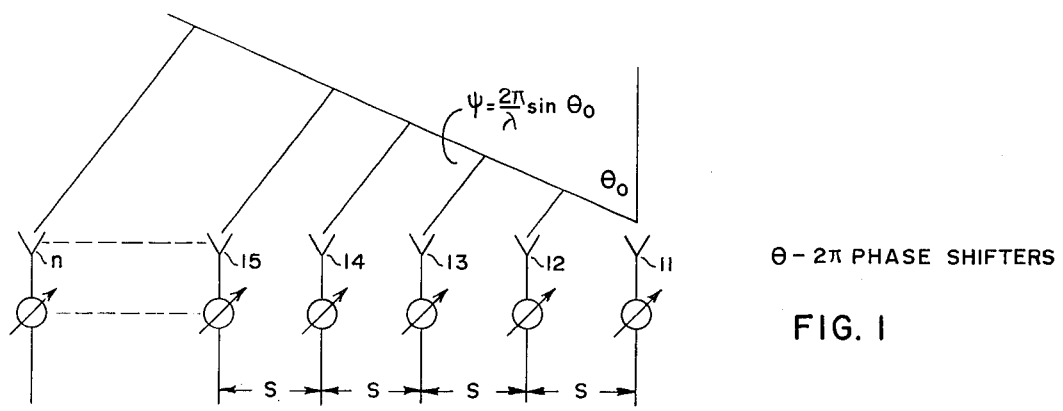
FIG. 1
θ – 2π PHASE SHIFTERS
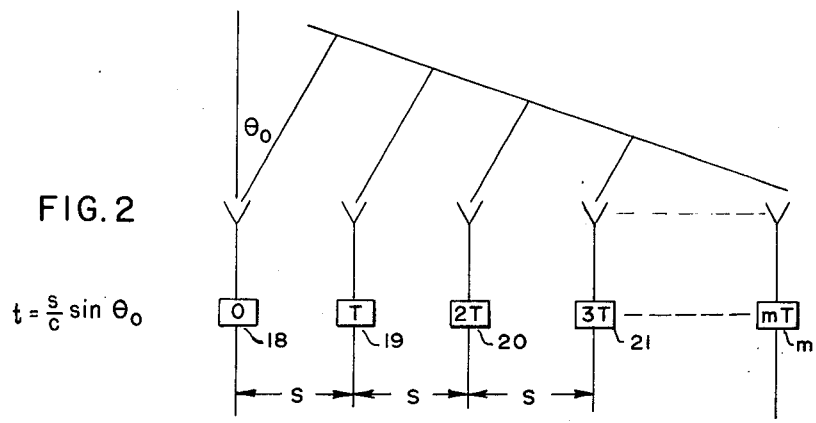
FIG. 2
$t = \frac{s}{c} \sin \theta_0$
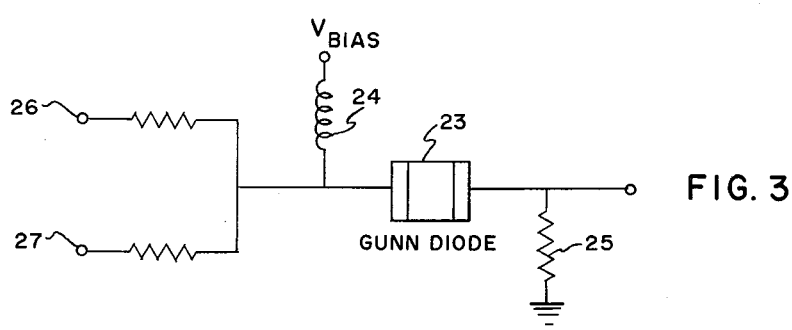
FIG. 3
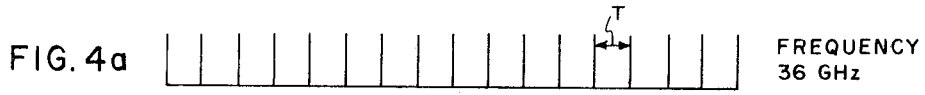
FIG. 4a    FREQUENCY 36 GHz
FIG. 4b    FREQUENCY 18 GHz
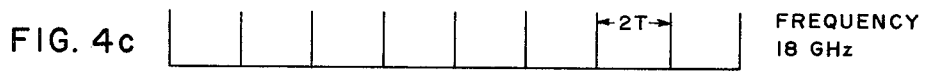
FIG. 4c    FREQUENCY 18 GHz

MICROWAVE TIMING CIRCUIT FOR BEAM STEERING

BACKGROUND OF THE INVENTION

Present antenna arrays are steered by devices that shift the phase of the radiation from each element in the array in such a manner as to cause the beam to shift in space. The basic disadvantage of this system is that groups of elements are excited at the same time and only their phases adjusted within the group. For a beam off broadside, the leading edge of electromagnetic pulse would comprise energy from the elements on one side of the array while the trailing edge of the pulse comprises energy from the opposite side of the array. Only the center of the pulse contains energy from all the elements. This effect is due to the fact that the elements are at physically different distances from any point in space broadside. As the aperture of the antenna increases in size or the pulse length of the radiation decreases, this aforementioned effect increases to a point where performance is degraded. Also, when steering a beam by phase shifting, the beam direction is a function of the output frequency. A narrow beam is therefore limited in instantaneous bandwidth since a broad bandwidth output will cause the beam to broaden. Phase scanning is also seen to be frequency sensitive.

In accordance with this invention, a Gunn diode is placed at the inputs of each element in the array and is triggered to provide a single pulse to the element causing the element to transmit. The Gunn devices are successively triggered with a time delay of T following triggering of the previous Gunn diode thereby enabling time delay steering of the antenna.

It is therefore an object of the present invention to provide fast and accurate time delay antenna steering.

A further object of the present invention is to provide a scanning system independent of frequency.

Yet another object of the present invention is to provide an antenna array not restricted in its instantaneous bandwidth.

A still further object of the present invention is to utilize Gunn diodes to provide only single output pulses to control an antenna array.

These and other objects and advantages of the present invention will become apparent from the following description of the illustrative embodiment of the invention taken in conjunction with the accompanying drawings in which:

FIG. 1 illustrates a prior art phase scanning antenna;

FIG. 2 illustrates a time delay scanning antenna in accordance with the teachings of this patent;

FIG. 3 illustrates the time delay device for use in the scanning antenna of FIG. 2; and FIGS. 4a–4c illustrates the timing pulses applied to the inputs of the time delay device of FIG. 3.

DESCRIPTION OF THE PREFERRED EMBODIMENT

The beam of an antenna points in a direction normal to the phase front. In phased arrays this phase front is adjusted to steer the element. Referring now to FIG. 1, the phase shifters are electronically actuated to permit rapid scanning and are adjusted in phase to a value between 0 and $2\pi$. With interelement spacing $s$, the incremental phase shift $\psi$ between adjacent elements 11–15, $n$ for a scan angle $\theta_o$ is $$\psi = (2\pi s/\lambda) \sin \nu_o \qquad (1)$$

If the phase is constant with frequency, the scan angle $\theta_o$ is frequency dependent such that $\sin \theta_o/\lambda$ is constant.

Unlike phase scanning, which is frequency sensitive, time delay scanning is independent of frequency. Referring to FIG. 2, time delay devices 18–21, $m$ are used instead of phase shifters to provide an incremental delay from element to element of $$t = (s/c) \sin \theta_o \qquad (2)$$

where $c$ is the velocity of propagation.

FIG. 3 represents the contemplated time delay device for use in elements 18–21, $m$ of FIG. 2. The circuit comprises a Gunn diode 23 biased through an inductance 24 and a load resistance 25 to ground. The bias is arranged to be suitable below the threshold voltage of the Gunn diode 23 so that no oscillations or high field domains occur spontaneously. Inputs 26 and 27 are arranged such that if a pulse is applied to either input alone, the total voltage (bias and input pulse) across the Gunn diode 23 is still insufficient to raise the voltage above threshold where a domain would be formed. If, however, simultaneous pulses are applied to both inputs 26 and 27, the total voltage across the Gunn diode 23 is above the threshold voltage and is sufficient to produce the formation of a domain resulting in a decrease in current through the load resistor 25. The basic mechanism of of domain formation in a Gunn diode is the scattering of electrons from one state into another. This mechanism operates in about $10^{-12}$ seconds. The domain acts like a capacitor which must be charged through the load resistance 25. This time is approximately $10^{-11}$ seconds.

Referring to FIG. 4a, a train of pulses, which may have a frequency of 36 GHz, is shown. These pulses are applied at input 26 of the Gunn diode 23 of FIG. 3. If pulses of coherent frequency with those applied to input 26 are now applied to input 27, such as shown in FIG. 4b, the output 28 (FIG. 4c) will be identical to input 27. If the frequency of the train of pulses at input 27 is 18 GHz, an output will occur when pulses are simultaneously applied at inputs 26 and 27. An output also occurs when the frequency of the pulses applied at input 27 is equal to $36/n$ GHz, where $n$ is a positive integer. No output occurs unless the pulse frequency to input 27 times an integer exactly equals the pulse frequency to input 26. The circuit is therefore said to be quantized. In FIG. 4, if the time between pulses on input 26 is considered to be a basic period T, it can be seen that the output period will be quantized to periods T, 2T, 3T . . . $n$T, as the frequency of the pulses at input 27 is decreased. Referring back to FIG. 2, it can be seen that the time delay requirements are T, 2T, 3T . . . $n$T, with the Gunn diode 23 of FIG. 3 serving as the basic timing device for an array of antenna radiating elements.

As an example of the steering ability of the circuit, the minimim angle off broadside of the beam from an array shown in FIG. 3 is given by the formula $$\theta = \sin^{-1}(TC/S) \qquad (2)$$

where
- $\theta$ is the angle the beam is steered off broadside
- $T$ is the basic time delay
- $C$ is the velocity of propogation
- $S$ is the distance between elements of the array Considering $C = \lambda_o f_o$, the output wavelength $\lambda_o$ and output frequency $f_o$ of the antenna and that the distance S is nominally $\lambda_o/2$, and that T is given by $1/f_t$, the frequency applied to input 26 of FIG. 2, the formula for the angle $\theta$ is given by $$\theta = \sin^{-1} 2(f_o/f_t) \qquad (3)$$

Where $f_t$ is 36 GHz and assuming $f_o$ is 2GHz $$\theta = \sin^{-1}(4/36) \approx 6°$$

It is therefore seen that there has been described a circuit for producing fast and accurate tuning pulses in a manner suitable for application to antenna array steering. It is also applicable in many other areas requiring accurate tuning. Lowering the frequency of operation below the microwave range enables even greater accuracy.

The invention is not limited to the embodiments described above, but all changes and modifications thereof not constituting departures from the spirit and scope of the invention are intended to be covered by the following claims.

What is claimed as new and desired to be secured by Letters Patent of the United States is:

1. An electronically steered antenna array comprising:
   a plurality of radiating elements:
   a plurality of Gunn diodes each having two inputs, one Gunn diode coupled to each of the inputs of said radiating elements; and
   means for triggering said Gunn diodes upon having a voltage on both of said inputs, the combined voltage on said inputs exceeding the threshold voltage of said diode forming a domain in said diode, whereby said radiating elements are caused to successively transmit at a time delay T from the transmission of an adjacent element.

2. An antenna array as recited in claim 1 wherein said diode produces only one output pulse each time it is triggered.

3. An antenna array as recited in claim 2 further including means for biasing said diode comprising bias voltage, an inductor and a load resistor.

4. An antenna array as recited in claim 1 wherein the frequency of one input of said diode is $p$GHz and the frequency of the other input is $p/q$ .GHz, wherein $p$ and $q$ are positive integers.

* * * * *